No. 753,378.

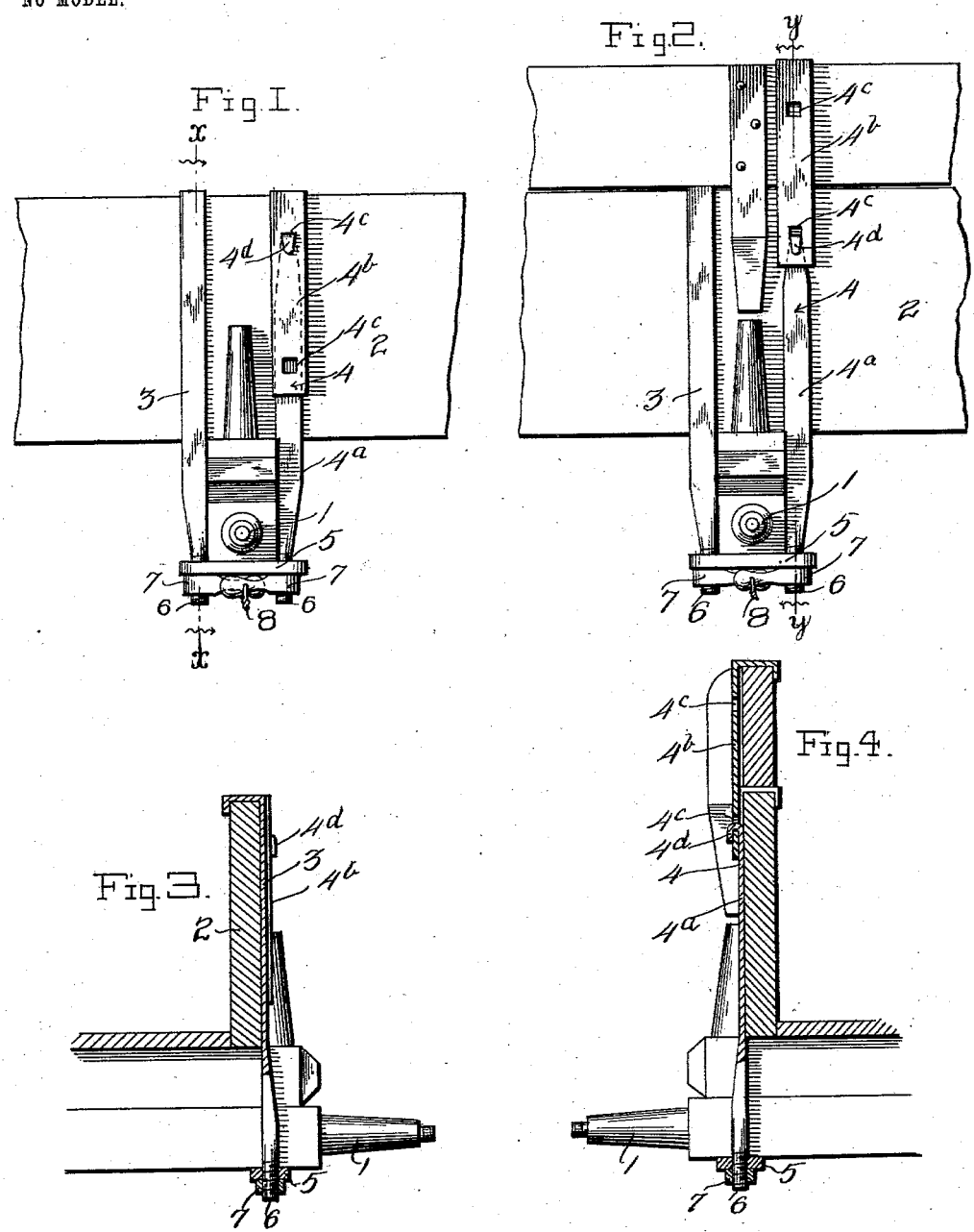

Patented March 1, 1904.

UNITED STATES PATENT OFFICE.

WILLIAM H. DULANEY, OF LEAKEY, TEXAS.

WAGON-BOX FASTENER.

SPECIFICATION forming part of Letters Patent No. 753,378, dated March 1, 1904.

Application filed November 20, 1902. Serial No. 132,085. (No model.)

*To all whom it may concern:*

Be it known that I, WILLIAM H. DULANEY, a citizen of the United States, residing at Leakey, in the county of Edwards and State of Texas, have invented certain new and useful Improvements in Wagons; and I do declare the following to be a full, clear, and exact description of the invention, such as will enable others skilled in the art to which it appertains to make and use the same.

The invention relates to wagons.

The object of the invention is to provide a simple, durable, and comparatively inexpensive means for securely holding the removable boxes of wagons to their axles, such means being applicable for also holding box extensions, which are used when it is desired to increase the capacity of the box of the wagon.

With these and other objects in view the invention consists of certain novel features of construction, combination, and arrangements of parts, as will be more fully described, and particularly pointed out in the appended claim.

In the accompanying drawings, Figure 1 is a side elevation of a fragment of a wagon-box and its axle, showing the manner of connecting the one to the other. Fig. 2 is a similar view showing an extension added to the box for the purpose of increasing the capacity of the box and illustrating the manner of connecting the extension to the axle and to the box proper. Fig. 3 is a vertical sectional view on line $x\,x$ of Fig. 1. Fig. 4 is a vertical sectional view of line $y\,y$ of Fig. 2.

Referring to the drawings, 1 denotes the axle, and 2 the box, of the wagon.

3 denotes a strap, the upper end of which is connected to the box 2, preferably by forming said strap at its upper end with a hook which engages the upper edge of said box.

4 denotes a two-part adjustable strap, the part $4^a$ of which is adjustably connected to the part $4^b$ by any suitable means, preferably by forming the part $4^b$ with a vertical row of holes $4^c$ and forming the upper end of the part $4^a$ with a hook $4^d$, adapted to engage any one of said holes. As shown in Fig. 1, the hook is shown as engaging the uppermost hole. This is the case when the extension is not added to the box. When, however, the capacity of the box is increased by the addition of the extension, the hook engages the lowermost hole, as shown in Fig. 2. The part $4^d$ is adapted to be attached to the box proper or to the extension in any suitable manner, preferably by having its upper end bent into the form of a hook, which is adapted to engage the upper edge of the box proper when the extension is not used and to engage the upper end of the extension when it is used.

The lower ends of the two straps 3 and 4 are connected to the axle in any suitable manner, preferably by a clip-plate 5, which extends under the axle and receives through the holes at its ends the threaded ends 6 of said straps. The nuts 7 are secured upon said threaded ends and are designed to hold the parts in position. These nuts may be of any construction; but hand-nuts are preferably used and are adapted to be arranged in juxtaposition to each other and permit of their being connected and thereby locked against rotation. To this end each wing of the hand-nut is provided with a hole which when the wings are brought together aline to permit of the insertion through said holes of a tie-wire 8.

From the foregoing description, taken in connection with the accompanying drawings, the construction, operation, and advantages of the invention will be readily understood without requiring an extended explanation. By the use of the device the wagon-box is prevented from vibrating vertically, which is objectionable in that it increases the wear as well as produces a disagreeable noise.

Various changes in the form, proportion, and the minor details of construction may be resorted to without departing from the principle or sacrificing any of the advantages of this invention.

Having thus described my invention, what I claim as new, and desire to secure by Letters Patent, is—

In a wagon-box fastener, the combination with a vehicle-box, and its running-gear, of a yoke extending under a fixed part of the running-gear, a strap bearing upon one side of the said fixed part of the running-gear and having at its upper end a hook engaging the upper edge of the box and at its lower end a bolt portion connected to one end of the yoke, and a second strap disposed on the opposite side of the yoke and comprising sections, namely, a lower section having at its lower end a bolt portion connected to the other end of the yoke and at its upper end a hook, and an upper section having at its upper end a hook and below the same spaced openings, the two straps thus serving as braces to prevent longitudinal play of the box on the running-gear, the first-named strap forming a permanent fastening for the body, and the said openings in the upper section of the sectional strap being so disposed that the hook on the upper section thereof may engage the upper edge of the box or a box extension applied thereto, and so that when said hook is engaged with the box, the hook on the lower section will engage the uppermost opening in the upper section, and when said hook on the upper section is engaged with the edge of a box extension the hook on the lower section will engage the lowermost opening of the upper section, thus fastening the box or both the box and box extension upon the running-gear, substantially as described.

In testimony whereof I have hereunto set my hand in presence of two subscribing witnesses.

WILLIAM H. DULANEY.

Witnesses:
J. H. DULANEY,
E. TUCKER.